Feb. 25, 1964 J. B. DEYSHER ETAL 3,122,646
CONTROL CIRCUIT
Filed April 14, 1959
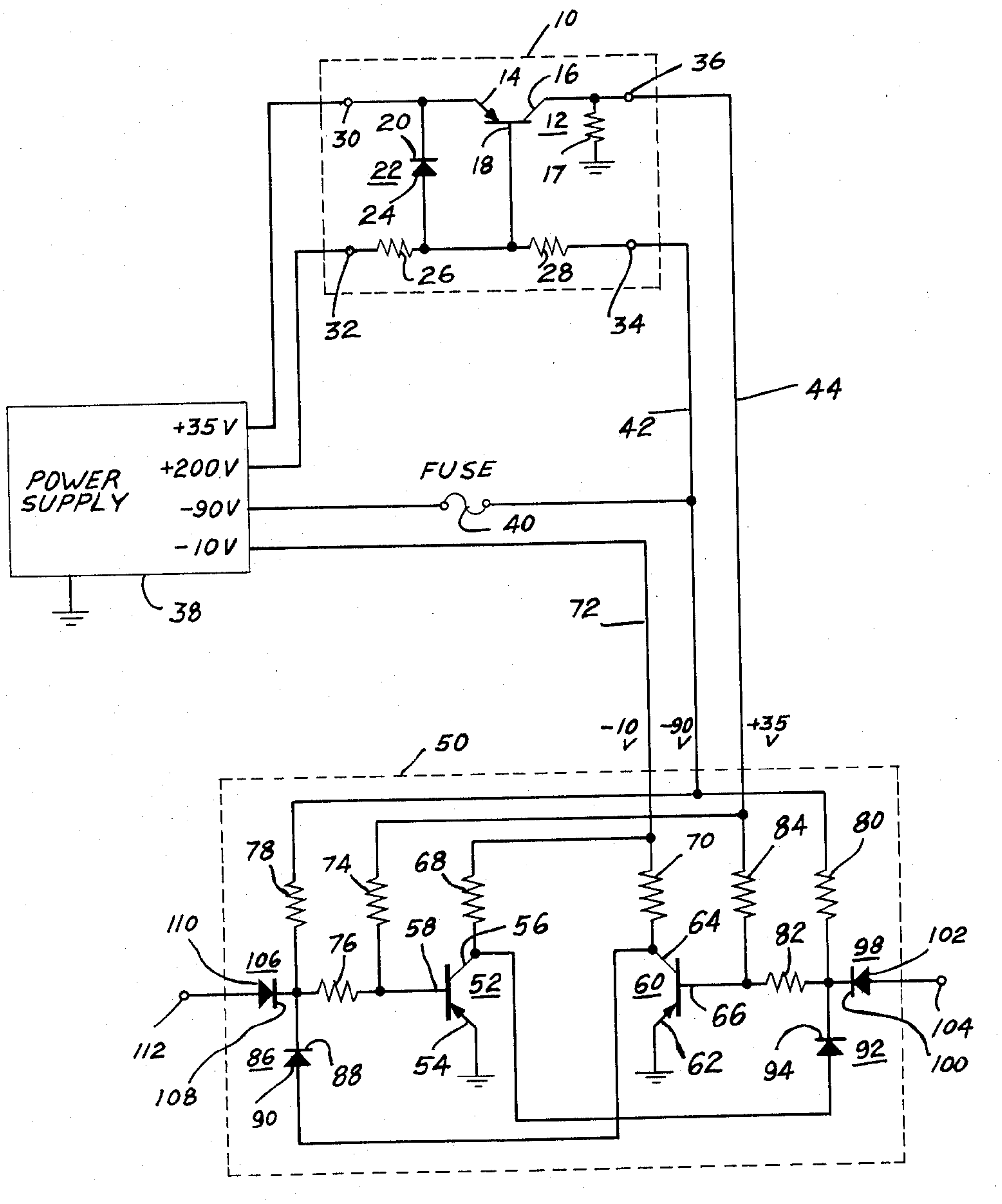
INVENTORS.
PETER E. SLAVIN
BY JAMES B. DEYSHER
Fred Fisher
ATTORNEY.

United States Patent Office 3,122,646

Patented Feb. 25, 1964

3,122,646
CONTROL CIRCUIT

James B. Deysher, Ambler, and Peter E. Slavin, Philadelphia, Pa., assignors to Sperry Rand Corporation, New York, N.Y., a corporation of Delaware Filed Apr. 14, 1959, Ser. No. 806,363
4 Claims. (Cl. 307—88.5)

This invention relates to control circuits, and more particularly relates to means for terminating a first power supplied to an electrical circuit upon the failure or faulty operation of a second power supplied to such circuit.

More specifically, this invention has utility in conjunction with a transistor load circuit, having main power and bias power applied thereto. The control circuit, as taught by this invention, terminates the application of the bias power to the transistor upon the failure or improper operation of the main power.

When the main power supplied to certain types of transistor circuitry is removed through failure, instantaneous removal of bias voltage is desired to prohibit destruction of transistors and diodes in the circuitry due to overload. One method of protecting circuitry from destruction due to overload is to utilize a fuse together with mechanical relays, so that, upon failure of the fuse, the mechanical relays remove all other voltages. However, when a fuse open-circuits, a finite amount of time elapses before other voltages are removed, due to the release time of the mechanical relays used in such protective circuits. The transistor control circuit, as taught by this invention, removes instantaneously one voltage in the event of the failure of another voltage. The speed of switching is determined by the time of the transistor turn-off and is approximately two microseconds. The destruction of the transistors and diodes in load circuits, therefore, is avoided.

It is an object of this invention to provide a novel bistable circuit.

It is a further object of this invention to provide a novel transistor circuit breaker.

An additional object of this invention is to provide novel means for controlling one voltage by a second voltage.

Another object of this invention is to provide a novel fuse circuit which operates at exceedingly high speeds.

An additional object of this invention is to provide a novel protective circuit for transistor devices.

In accordance with this invention, a controlled voltage is terminated by the failure of a controlling voltage. The voltage to be controlled is supplied to the emitter of a transistor, which transistor provides controlled voltage at its collector. The controlling voltage, together with another voltage, is connected to a voltage divider. The voltage divider is connected to the base of the transistor in a manner to bias the transistor in a forward direction so that the potential difference between the base and the emitter is approximately one volt. A diode is connected between the base and the emitter and poled in a direction so that, when the transistor is forward biased, the diode is reverse-biased. Upon failure of the controlling voltage, current from the voltage divider flows through the diode, creating a small voltage drop across the diode, sufficient to reverse-bias the base of the transistor, thereby causing current to cease to flow through the transistor. The controlled voltage, therefore, is removed, and remains removed until the reinitiation of the controlling voltage.

Additional objects and advantages of this invention, together with its construction and mode of operation, will be more apparent from the following description, when read in connection with the accompanying drawing which illustrates one embodiment of a control circuit in accordance with this invention, together with a typical load circuit.

Referring to the sole figure, the control circuit 10 includes a PNP transistor 12 having an emitter 14, a collector 16, and a base 18. The collector 16 is coupled to one end of a load resistor 17 having its other end coupled to a source of constant reference potential, such as ground. The emitter 14 is connected to a cathode 20 of a diode 22 having its anode 24 connected to the base 18 of the transistor 12. A voltage divider comprising a pair of connected resistors 26 and 28 has its common connection coupled to the base 18 of the transistor 12. The control circuit 10 has a pair of input terminals 30 and 32 connected, respectively, to the emitter 14 of the transistor 12 and to the voltage divider at the resistor 26. A controlling voltage terminal 34 is connected to the voltage divider at the resistor 28. The controlled voltage terminal 36 is connected to the collector 16 of the transistor 12.

A power supply 38 is adapted to provide a plurality of output voltages for operation of both the control circuit 10 and the load circuit 50. The voltage to be controlled (in the embodiment shown, +35 volts) is connected to the input terminal 30. A voltage of +200 volts is connected to the input terminal 32. The controlling voltage −90 volts is connected through a fuse 40, or other impedance subject to failure, to a line 42. The controlling voltage input terminal 34 of the control circuit 10 is connected to the load circuit 50 by the line 42. The controlled voltage terminal 36 is connected to the load circuit 50 by means of a wire 44.

Different types of load circuits can be used in conjunction with the control circuit. To illustrate the utility and advantages of the invention, a transistor flip-flop circuit is shown as the load circuit 50. The load circuit 50, as shown, includes a PNP transistor 52, having an emitter 54, a collector 56, and a base 58. The emitter 54 is connected to a point of constant reference potential, such as ground. A similar PNP transistor 60, having an emitter 62, a collector 64, and a base 66, has its emitter 62 coupled to the source of constant current potential, such as ground. Collector resistors 68, 70 are connected, respectively, to the collectors 56, 64 of the transistors 52, 60. The power supply 38 supplies constant voltage of approximately −10 volts to the collector resistors 68, 70 by means of a line 72. A base biasing resistor 74 connects the base 58 of the transistor 52 to the +35 volts controlled voltage line 44. A base resistor 76 further connects the base 58 to one end of a resistor 78 having its other end connected to the −90 volts controlling voltage line 42. The −90 volts controlling voltage line 42 is connected to one end of a resistor 80, which resistor has its other end connected to one end of a base resistor 82, the other end of the base resistor 82 being connected to the base 66 of the transistor 60. A base biasing resistor 84 connects the base 66 of the transistor 60 to the +35 volts controlled voltage line 44.

A diode 86 has its cathode 88 connected to the common connection of the resistors 76, 78, and has its anode 90 connected to the collector 64 of the transistor 60. In similar fashion, a diode 92 has its cathode 94 connected to the common connection of the resistors 80, 82, and has its anode 96 connected to the collector 56 of the transistor 52. A buffing diode 98 has its cathode 100 connected to the cathode 94 of the diode 92, and has its anode 102 connected to a set terminal 104. Likewise, a diode 106 has its cathode 108 connected to the cathode 88 of the diode 86, and has its anode 110 connected to a reset terminal 112. The flip-flop circuit 50 operates in a normal manner, whereby, when one transistor 52, 60 conducts, the other is non-conducting. The state of the flip-flop circuit 50 may be changed by applying a positive pulse to the appropriate set or reset terminals 104, 112.

With the potentials described, and with the typical values of resistors and transistors as described hereinafter, the potentials at the base 58 and the base 66 of the transistors 52, 60 are +2 volts and −8 volts, respectively, during one state of normal operation. During the other state of normal operation, the potentials at these points are −8 volts and +2 volts, respectively.

The reverse bias of one of the transistors 52 or 60 is approximately 2 volts between base and emitter. If, however, the fuse 40 should fail, or for some reason the controlling voltage line 42 should abnormally approach zero-potential, the potential applied to the base 58 or 66 of the transistor 52 or 60 tends to approach +35 volts with respect to the emitters 54 or 62. But for this invention, when the voltage applied to the line 44 is +35 volts and the voltage on the line 42 is zero volts (such as caused by a failure of the fuse 40), the potential +35 volts occurs at base 58. The emitter 54 of the transistor 52 is connected to ground. This reverse or back bias of +35 volts is sufficient to damage the transistor 52, 60, thereby destroying the utility of the load circuit 50. As a safeguard, however, as described hereinafter, applicants' circuit 10, upon a drop of voltage or short circuit on the line 42, provides no output on the line 44.

The power supply 38 supplies +35 volts, through the terminal 30, to the emitter 14 of the transistor 12. The potential, therefore, at the emitter 14 of the transistor 12 remains constant at +35 volts. The power supply 38 also provides +200 volts to the terminal 32, and −90 volts, through a fuse 40, by means of the line 42 to the terminal 34. The +200 volts and −90 volts at the terminals 32 and 34 are connected to a voltage divider 26, 28 so that the common connection of the resistors 26, 28 is at a potential of approximately +34 volts. The +34 volts potential is coupled to the base 18 of the transistor 12, and the base 18 being negative with respect to the emitter 14, causes forward current conduction through the transistor 12 so that the potential at the collector 16 of the transistor 12 is approximately +35 volts. Because the anode 24 of the diode 22 is negative with respect to the cathode 20 of the diode 22, no current flows through the diode 22. Therefore, in normal operation, current from the +35 volts terminal from the power supply 38 enters the terminal 30, passes through the transistor 12, develops a voltage across the load resistor 17, and thus provides an output current at the terminal 36 which has a potential of approximately +35 volts. When, due to abnormal operation, or other reason, the fuse 40 open-circuits (or otherwise the voltage applied to the terminal 34 approaches zero), the base 18 of the transistor 12 tends to become more positive due to the +200 volts potential applied to the terminal 32. Current flows from the power supply 38, from the +200 volts source, through the terminal 32, and the resistor 26, to the anode 24 of diode 22. The anode 24, being at a higher potential than the cathode 20, causes current to flow through the diode 22. Because the diode 22 is a low potential device, the voltage drop across the diode 22 is on the order of approximately one volt. This one volt-differential across the diode 22 is sufficient, however, to apply a back bias of one volt between the emitter 14 and the base 18 of the transistor 12, thereby causing the transistor 12 to cease to conduct. The output terminal 36, connected to the collector 16 of the transistor 12, is, therefore, at ground potential.

Upon replacement of the fuse 40 and upon eliminating the failure causing condition, the voltage applied on the line 42 again becomes −90 volts. This voltage is sufficient to again turn on the transistor 12 causing conduction therethrough, and thereby providing an output of +35 volts upon the line 44.

The novel control circuit 10 has many advantages. The circuit can be used, as described hereinabove, for controlling bias voltages of transistor loads. The control circuit 10 can be used as a gating circuit or as a bistable circuit, the output applied to the line 44 being controlled by the voltage applied on the line 42.

Illustrated below are typical values of components used in one embodiment of the invention and for a typical load circuit. Other values may be used without digressing from the scope of this invention.

| | | |
|---|---|---|
| Transistors: | | |
| 12 | | ------ |
| 52 | | 2N426 |
| 60 | | ------ |
| Resistors: | | |
| 17 | ohms | 10,000 |
| 26 | do | 20,000 |
| 28 | do | 10,000 |
| 68 | do | 10,000 |
| 70 | do | 10,000 |
| 74 | do | 33,000 |
| 76 | do | 2,000 |
| 78 | do | 33,000 |
| 80 | do | 33,000 |
| 82 | do | 2,000 |
| 84 | do | 33,000 |
| Diode 22 | | 1N350 |

Various modifications may be made to the circuits which are within the spirit of applicants' invention. For example, the transistor and diode may be opposite conductivity types so that a positive controlling voltage may operate upon a negative controlled voltage.

What is claimed is:

1. A first means for receiving a first voltage to be controlled; a second means for receiving a second voltage; a third means for receiving a third voltage, said third voltage being subject to abnormal operation; a pair of resistors directly connected to each other in a series relationship, the connection of said resistors defining a common junction terminal, one end of said pair of resistors being connected to said second means, and the other end of said pair being connected to said third means; unilateral conducting means coupling said first means to said junction terminal; a load circuit; and a transistor having one electrode coupled to said junction terminal, a second electrode coupled to said first means, and a third electrode connected to said load circuit; said third means being directly connected to said load circuit.

2. In combination, a power supply adapted to provide a plurality of voltages, a control circuit and a load circuit, said power supply, control circuit and load circuit being interconnected with one another; said load circuit comprising means for utilizing a first and second voltage concurrently, said load circuit upon abnormal failure of said first voltage requiring said second voltage to be terminated in order to prevent destruction thereto; said control circuit comprising an amplifier having input, output and control electrodes, said output electrode being adapted to provide said second voltage, said input electrode being connected to said power supply, impedance means directly connecting said control electrode to said load circuit for providing said first voltage, second impedance means directly connecting said control electrode to said power supply, unilateral conducting means directly connected between said input and control electrodes, said unilateral conducting means being poled in a direction to conduct when said amplifier is non-conducting and to cease to conduct when said amplifier is conducting.

3. In combination, a power supply adapted to provide a plurality of voltages, a control circuit and a load circuit, said power supply, control circuit and load circuit being interconnected with one another, said load circuit comprising means for utilizing a first and second voltage concurrently, said load circuit upon abnormal failure of said first voltage requiring said second voltage to be terminated in order to prevent destruction thereto, said control circuit comprising a transistor having input, output and control electrodes, said output electrode being adapted to provide said second voltage, said input electrode being connected to said power supply, impedance means directly connecting said control electrode to said load circuit for providing said first voltage, second impedance means directly connecting said control electrode to said power supply, unilateral conducting means directly connected between said input and control electrodes, said unilateral conducting means being poled in a direction to conduct in a direction opposite to the direction of conductivity of said transistor.

4. In combination, a power supply adapted to provide a plurality of voltages, a control circuit and a transistor load circuit, said power supply, control circuit and transistor load circuit being interconnected with one another, said transistor load circuit comprising means for utilizing a first and second voltage concurrently, said transistor load circuit upon abnormal failure of said first voltage requiring said second voltage to be terminated in order to prevent destruction thereto, said control circuit comprising a transistor having input, output and control electrodes, said output electrode being adapted to provide said second voltage, said input electrode being connected to said power supply, impedance means directly connecting said control electrode to said transistor load circuit for providing said first voltage, second impedance means directly connecting said control electrode to said power supply, unilateral conducting means directly connected between said input and control electrodes, said unilateral conducting means being poled in a direction to conduct in a direction opposite to the direction of conductivity of said transistor.

References Cited in the file of this patent

UNITED STATES PATENTS

| | | |
|---|---|---|
| 2,874,312 | Radcliffe et al. | Feb. 17, 1959 |
| 2,876,367 | Summer | Mar. 3, 1959 |
| 2,891,726 | Decker et al. | June 23, 1959 |
| 2,904,678 | Malchow | Sept. 15, 1959 |
| 2,931,920 | Baker | Apr. 5, 1960 |
| 2,947,950 | Pinckaers | Aug. 2, 1960 |
| 2,949,543 | Nordahl et al. | Aug. 16, 1960 |
| 2,978,595 | MacKay | Apr. 4, 1961 |